United States Patent Office 3,359,818
Patented Dec. 26, 1967

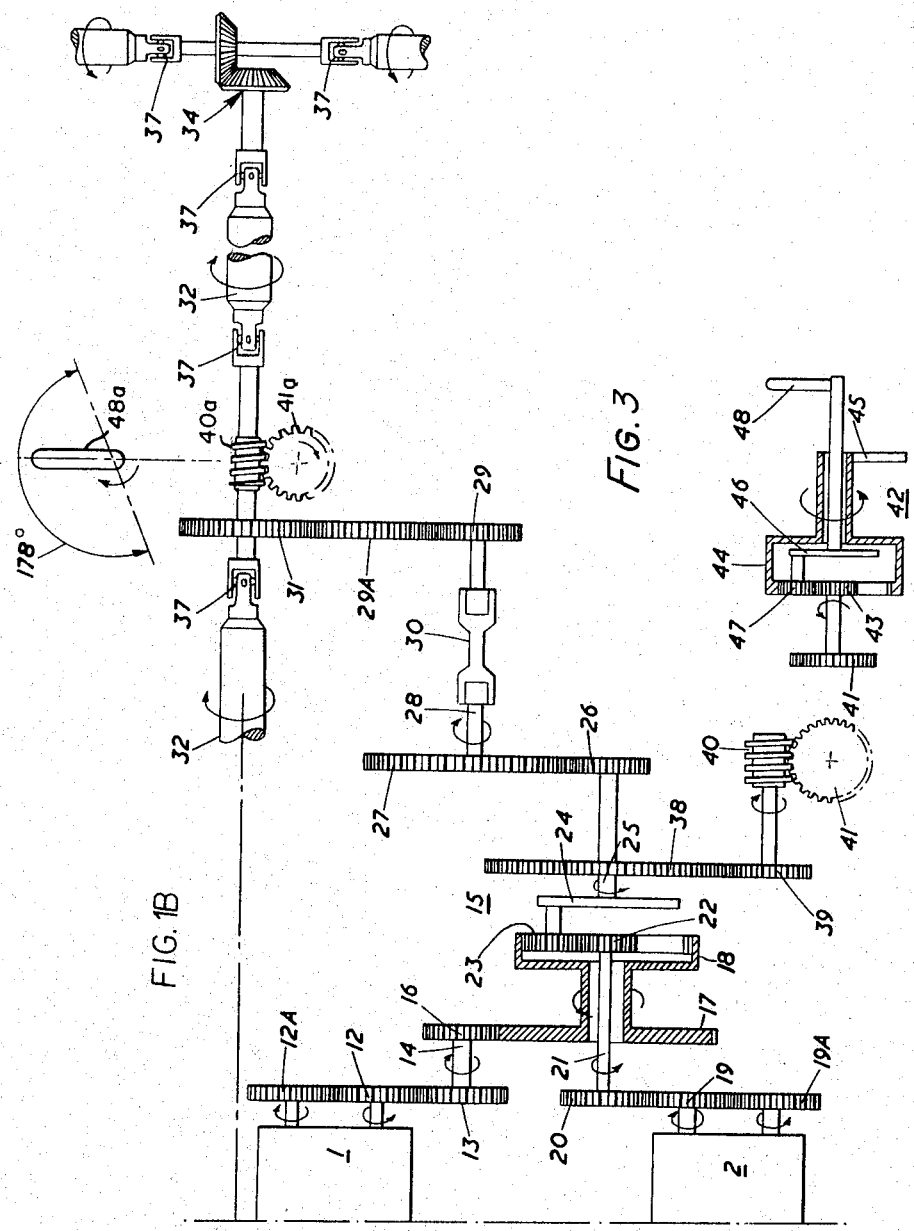

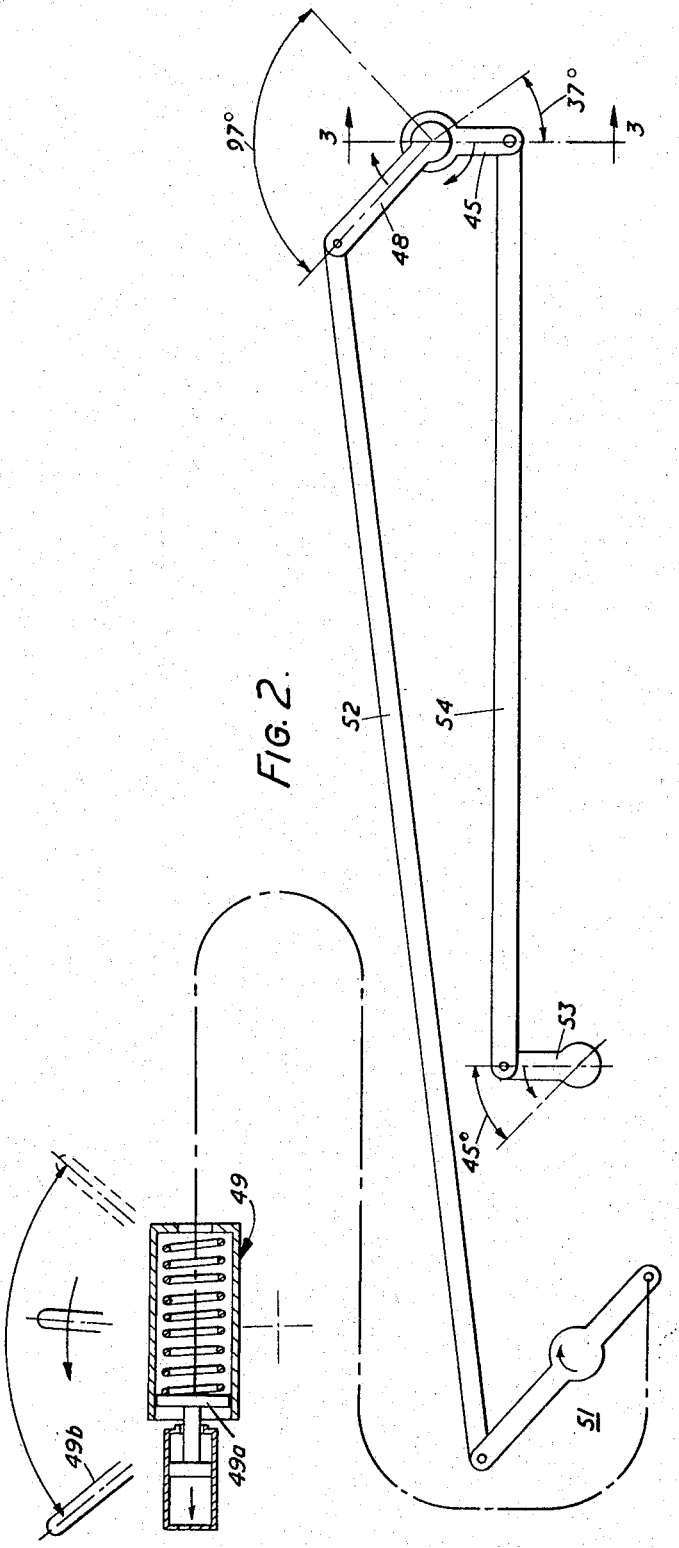

3,359,818
ACTUATION SYSTEM MORE PARTICULARLY
FOR CHANGING THE DIRECTION OF THE JET
ENGINE NOZZLES OF A VERTICAL TAKE-OFF
AND LANDING AIRCRAFT
Geoffrey J. Deverell, Southampton, and Peter B. Kahn,
Catisfield, Fareham, England, assignors to The Plessey
Company Limited, Ilford, England, a British company
Filed Mar. 23, 1965, Ser. No. 442,130
6 Claims. (Cl. 74—388)

ABSTRACT OF THE DISCLOSURE

In a pneumatic deflection system for the jet engine nozzles of a vertical take off and landing aircraft the output shaft for connection to the nozzles is driven, through a first three-legged differential gear drive, by two reversible displacement-type air motors each having a first and a second air connection, and an air control valve having a pressure inlet for connection to a pressure-fluid supply and an exhaust outlet and two service connections has the first connection of both air motors permanently connected to said one service connection and said second connection of both air motors connected to said other service connection of the valve, and is arranged in a neutral position of the valve to prevent flow from said inlet through the air motor to said exhaust outlet, in a first operative position at one side of the neutral position to connect one of the service connections with the said inlet and the other service connection with the exhaust outlet; and in a further operative position at the opposite side of the neutral position to reverse said connections of said first operative position. The valve has a control lever which is connected by a second three-legged differential gear drive to a pilot's control lever while the third leg of the second differential gear drive is connected with the output shaft to obtain a feedback.

Figure 1A:
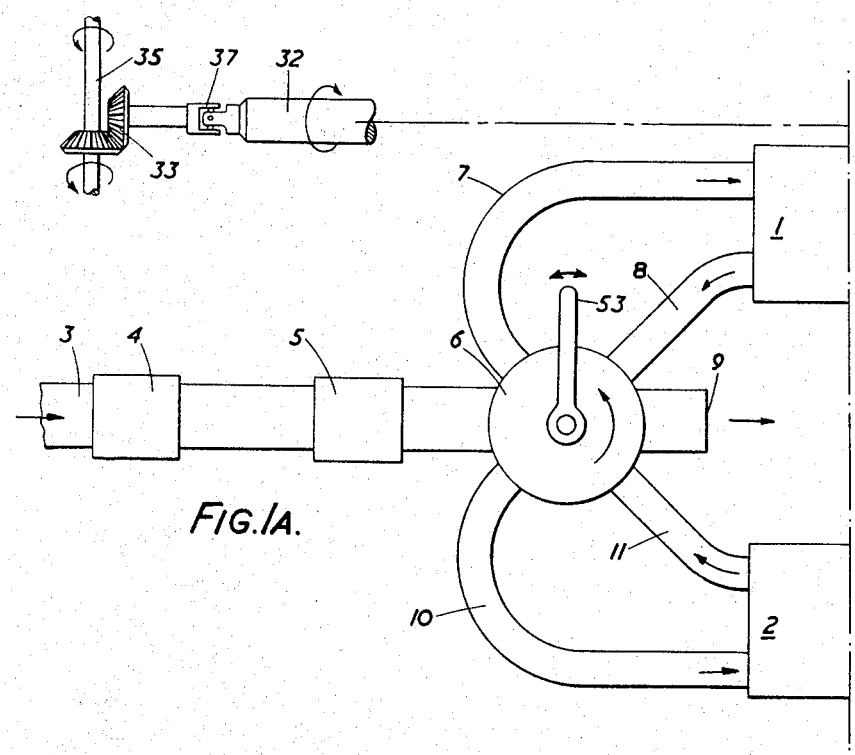

This invention relates to an actuation system which is particularly suitable for changing the directions of the jet engine nozzles of a vertical take-off and landing aircraft between a substantially horizontal position characteristic of horizontal flight and a substantially vertical position characteristic of landing or take-off.

It is an object of the present invention to provide an improved servo-actuation system of great reliability which will ensure positional correspondence between the output and a primary input element at the end of each operation, even in the case of failure of a servomotor.

The specification and drawing of United States Patent No. 3,109,318 discloses control units which, when actuated by the pilot of an aircraft, enable the positions of aircraft jet nozzles to be preset from the cockpit the setting being transmitted by a pre-loaded resiliently yielding member. Such units can be used in the system hereinafter described.

The present invention provides an actuation system, more particularly for the change of the directions of the jet engine nozzles of a vertical-take-off-and-landing aircraft between a substantially horizontal and a substantially vertical position, wherein two reversible air motors, fed in parallel to each other with pressurised air through a common control valve, form two inputs of a three-leg differential gear drive whose third leg constitutes the output of the system, the valve having a valve-control element which is coupled by a further differential system to a primary input element and to a feed-back element driven from the third leg of the differential gear drive.

One constructional form of the invention will now be described in more detail with reference to the drawing accompanying the specification, in which FIGURES 1A and 1B, when joined together along the chain-dotted line, form a schematic elevation representing a jet-propulsion nozzle actuation system, and are hereinafter jointly referred to as FIGURE 1.

FIGURE 2 is a diagrammatic representation to an enlarged scale of a detail of the actuation system, and FIGURE 3 is a section on line 3—3 of FIGURE 2.

The jet nozzle actuation system illustrated in FIGURE 1 is intended for use with an aircraft which is provided with two sets of positionally adjustable jet nozzles. These sets are spaced from each other longitudinally of the aircraft, one set may be termed the forward nozzles and the other set may be termed the rear nozzles.

Both the forward and rear sets of nozzles (which are not shown in the drawings) are pivotally mounted with respect to the aircraft and are arranged to be moved relative to the aircraft by the actuation system shown. This system includes air motors 1 and 2 which are of the intermeshing-lobed-rotor type and are connected to receive driving air from a common air inlet 3 via a torque limiting device 4, an air filter 5 and a rotary control valve 6. When the valve 6 is in a certain position driving air is fed via an inlet conduit 7 to the motor 1 and from the motor 1 via air outlet conduit 8 to an air exhaust 9, while driving air for the motor 2 travels from the valve 6 via a conduit 10 and from the air motor via an outlet conduit 11 through the valve 6 to the exhaust 9. The directions of rotation of the lobed rotors of the air motor are schematically indicated by arrows encircling the rotor shafts of the air motor.

The air motor 1 has an output drive gear 12 which is connected to drive via a gear 13, a lay shaft 14 and a drive gear 16 a combined epicyclic differential gearing unit 15. The lobed rotors of the air motor 1 are phased in the usual manner by means of a phasing gear 12A which meshes with the gear 12. The drive gear 16 which is connected to drive a gear 17, is integrally connected with an annular gear 18 which forms an outer sun gear of the epicyclic gearing unit 15.

The air motor 2 has an output drive gear 19 which meshes with a gear 20 provided at one end of a shaft 21 which is co-axial with the gears 17 and 18 and which carries at its other end the inner sun gear 22 of the epicyclic gearing unit 15. A phasing gear 19A maintains the phase relationship between the lobed rotors of the air motor 2. The gears 18 and 22 simultaneously mesh with the planet wheels 23 (only one planet wheel 23 being shown) which are carried on a planet-wheel carrier 24 which is connected with a differential output shaft 25. Shaft 25 carries a driving gear 26 which meshes with a gear 27 carried upon a shaft 28 which is connected with the input gear 29 of an auxiliary gear box (not separately shown) via a shear-neck torque-limiting device 30. The gear 29 drives, via idler gear 29A forming part of an auxiliary gear box drive a gear 31 carried upon a main drive shaft assembly 32, which latter is connected by two sets of bevel gearing 33 and 34 respectively with the forward and rear sets of jet nozzles.

The forward pair of nozzles is movable, under the control of the valve 6, from a vertical position to a horizontal position and vice versa via the gearing 33, and a shaft 35 via for example a chain drive means (not shown). Similarly the rear pair of nozzles are connected to receive drive from a drive shaft driven from the shaft 32 via the gearing 34, and suitable drive means, for example a chain drive (not shown), for likewise moving the rear nozzles from a vertical to a horizontal position and vice versa. The drive shaft 32 and shaft 35 and 36 include various flexible coupling arrangements 37.

The shaft 25 carries, in addition to the gear 26, a further gear 38 which meshes with a further gear 39 carried upon one end of a shaft having a wrom 40 at its other end, which drives a worm wheel 41 forming the input to a feed-back arrangement 42 associated with the pilot's control. The feed-back arrangement 42 includes an epicyclic drive shown more clearly in FIGURE 3. The shaft of the worm wheel 41 carries a sun-wheel 43 of the epicyclic device, whose other sun wheel annulus 44, is arranged to drive a rotary valve lever 45, whilst a planet wheel carrier 46, having planet wheels 47 meshing with the sun-wheel 43 and the annulus 44, is connected to a lever 48, which may be termed a pilot's lever. Alternatively the differential-gear connection between the control lever and the output shaft may be effected at a point beyond the shear-neck coupling 30, as digrammatically indicated in FIGURE 1B by the worm 40a, the worm gear 41a, and the pilot's lever 48a.

A pilot's control unit 49 is of the kind described in the said U.S. Patent No. 3,109,318 and contains a preloaded, resiliently yielding member 49a, which is interposed between a pilot's control lever 49b and a Bowden cable 50 leading to a lever 51 which is connected via a link 52 to the said pilot's lever 48. The rotary valve 6 shown in FIGURE 1 has a control lever 53 which, as shown in FIGURE 2, is rotatable via a link 54 by the lever 45 of the feedback unit 42 so as to be under the joint control of the pilot's control unit 49 and of the feed-back from worm wheel 41. The relative angular movements of the levers 45, 48 and 53 shown in FIGURE 2 are indicated in the figure.

The above described apparatus operates in the following manner.

The pilot moves the lever 49b of the control unit 49 in the cockpit to the desired angular position and thus, via lever 51, lever 48, differential drive 42, and lever 45, moves the lever 53 into the valve-open position for the required direction of motor rotation. As a result air from inlet 3 travels via the torque limiting device 4, preferably a pressure reducing valve, the air filter 5, and the conduits 7 and 10 (or 8 and 11) to the air motors 1 and 2. The air motors 1 and 2 will drive through their associated gearing the annulus 18 and the inner sun gear 22 of the epicyclic differential unit 15. The combined drive is fed from the planet wheel carrier 24 to the shaft 25. The drive is then transmitted from the output shaft 25, the gear 26, the gear 27, the shaft 28, the shear neck torque limiting device 30, and the gears 29, 29A and 31 to the shafts 32. The rotation of the shafts 32 will turn the shafts 36 and 35 in the required direction so as to cause the nozzles to rotate from one of their positions of rest to the other. Drive is also being transmitted from output shaft 25 via the gears 39, 40 and 41 into the feed-back epicyclic arrangement 42, to vary the angle between the levers 45 and 48, thus causing valve-control lever 53 to move in the direction opposite to that in which it was previously moved by the movement of the pilot's control lever 49b. This return movement of the lever 53 progressively closes the rotary valve 6. The arrangement of the feed-back and the movement of the valve is such that the valve is fully closed substantially as soon as the nozzles have been moved to the position determined by this new setting of the pilot's control lever 49b.

The torque limiting device 4 provided in the air inlet 3 to the air motors 1 and 2 is arranged to form a first protective device in the event that some form of defect or overload prevents any one of the nozzles from moving between its two rest positions. It will be appreciated that in the event that either of the nozzles is unable to move, the shaft 32 will be prevented from rotating and in consequence the air motors will be prevented from rotating. The stresses liable to be developed within the system under these circumstances are limited by the presence of a pressure-reducing valve employed as the torque-limiter 4, since this valve limits the pressure of the input air to the air motors to a predetermined value.

To prevent damage in the event that in addition the pressure-reducing valve should fail to maintain the pressure below such predetermined maximum, the shear neck device 30 is provided in the main drive system from the combined epicyclic differential gearing unit 15 to the auxiliary gear box idler gear 29. The shear neck device 30 is arranged to break before the torque transmitted by it reaches a value liable to cause breakage in the drive interconnecting the individual nozzles, and will thereby prevent the possibility of the nozzles moving out of synchronism.

What we claim is:

1. An actuation system for the change of direction of jet-engine nozzles in a vertical-take-off-and-landing aircraft, comprising two reversible displacement-type air motors, a single control valve including a control member having a central position in which the valve cuts off the passage of air through both air motors, a first operative position at one side of the central position in which the valve permits passage of air through both air motors in parallel to each other in a first direction, and a second operative position at the other side of the neutral position, in which the valve permits passage of air through both air motors in parallel to each other in a direction opposite to said first direction, an output shaft for connection to at least one jet-engine nozzle, a first three-legged differential gear drive the three legs of which are respectively operatively connected to said two air motors and to said output shaft, a pilot's control element, a feed-back member driven by said output shaft, and a second three-legged differential gear drive the three legs of which are respectively connected to the pilot's lever, the feedback member, and said control member.

2. An actuation system as claimed in claim 1 including a pressure-limiting device limiting the pressure admitted to the control valve.

3. An actuation system as claimed in claim 1, wherein a preloaded resiliently yielding element is interposed between the pilot's control element and the said second differential drive.

4. An actuation system as claimed in claim 1, wherein the air motors are rotary displacement motors.

5. An actuation system as claimed in claim 1, two jet-control elements respectively controlling the direction of two jet-engine nozzles, the output shaft of the differential gear drive being connected in parallel to said two control elements so as to ensure directional coincidence of the two-engine nozzles.

6. An actuation system as claimed in claim 5, including a shear-neck pin interposed between the output shaft and the two parallel-connected jet-control elements.

References Cited
UNITED STATES PATENTS

| | | | |
|---|---|---|---|
| 2,974,594 | 3/1961 | Boehm | 244—76 |
| 3,048,050 | 8/1962 | Perryman | 74—388 |
| 3,098,628 | 7/1963 | Chaplin | 244—12 |
| 3,109,318 | 11/1963 | Kahn et al. | 74—470 |
| 3,146,589 | 9/1964 | Twyford | 60—232 |
| 3,193,218 | 7/1965 | Ernst et al. | 244—76 |

DONLEY J. STOCKING, *Primary Examiner.*

DAVID J. WILLIAMOWSKY, *Examiner.*

H. S. LAYTON, *Assistant Examiner.*